(12) United States Patent
Yuk et al.

(10) Patent No.: US 9,998,210 B2
(45) Date of Patent: Jun. 12, 2018

(54) APPARATUS FOR TRANSCEIVING SIGNALS USING A TDD (TIME DIVISION DUPLEX) FRAME STRUCTURE IN A WIRELESS COMMUNICATION SYSTEM AND METHOD THEREOF

(71) Applicant: LG ELECTRONICS INC., Seoul (KR)

(72) Inventors: Youngsoo Yuk, Anyang-si (KR); Jaehoon Chung, Anyang-si (KR); Hyeyoung Choi, Anyang-si (KR); Hyunsoo Ko, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days. days.

(21) Appl. No.: 14/408,532

(22) PCT Filed: Jun. 17, 2013

(86) PCT No.: PCT/KR2013/005314
§ 371 (c)(1),
(2) Date: Dec. 16, 2014

(87) PCT Pub. No.: WO2013/191420
PCT Pub. Date: Dec. 27, 2013

(65) Prior Publication Data
US 2015/0162979 A1    Jun. 11, 2015

Related U.S. Application Data

(60) Provisional application No. 61/660,791, filed on Jun. 17, 2012, provisional application No. 61/664,760, filed on Jun. 27, 2012.

(51) Int. Cl.
*H04J 3/00* (2006.01)
*H04L 5/00* (2006.01)
(Continued)

(52) U.S. Cl.
CPC ......... *H04B 7/2656* (2013.01); *H04B 7/2643* (2013.01); *H04L 5/001* (2013.01);
(Continued)

(58) Field of Classification Search
CPC . H04W 72/1268; H04W 72/04; H04W 72/12; H04W 72/0453; H04B 7/26;
(Continued)

(56) References Cited

U.S. PATENT DOCUMENTS

2007/0025290 A1    2/2007   Afrashteh et al.
2007/0097897 A1    5/2007   Teague et al.
(Continued)

FOREIGN PATENT DOCUMENTS

CN    101686103    3/2010
CN    101843009    9/2010
(Continued)

OTHER PUBLICATIONS

European Patent Office Application Serial No. 13806091.8, Search Report dated Jan. 27, 2016, 8 pages.
(Continued)

*Primary Examiner* — Edan Orgad
*Assistant Examiner* — Vanneilian Lalchinthang
(74) *Attorney, Agent, or Firm* — Lee Hong Degerman Kang Waimey (57) ABSTRACT

A method of transceiving a signal by a base station using a TDD frame structure in a wireless communication system, includes transceiving the signal using a TDD frame in accordance with the TDD frame structure, wherein the TDD frame comprises a static downlink subframe region, a static uplink subframe region and a dynamic region changeable into a downlink subframe or an uplink subframe, wherein the TDD frame is configured in a manner that at least one of the static downlink subframe region, the status uplink sub-
(Continued)

frame region and the dynamic region is assigned to a user equipment in consideration of a location of the user equipment in a cell, and wherein the signal is transceived with the user equipment via at least one region assigned in the TDD frame.

10 Claims, 3 Drawing Sheets

(51) Int. Cl.
  *H04B 7/26*  (2006.01)
  *H04W 72/04*  (2009.01)
  *H04L 5/14*  (2006.01)
  *H04W 72/12*  (2009.01)
  *H04W 72/08*  (2009.01)

(52) U.S. Cl.
  CPC .......... *H04L 5/0069* (2013.01); *H04L 5/0073* (2013.01); *H04L 5/14* (2013.01); *H04L 5/1469* (2013.01); *H04W 72/0426* (2013.01); *H04W 72/0446* (2013.01); *H04W 72/0453* (2013.01); *H04W 72/1268* (2013.01); *H04L 5/0048* (2013.01); *H04W 72/082* (2013.01)

(58) Field of Classification Search
  CPC ....... H04B 7/2643; H04L 5/14; H04L 5/0048; H04L 5/0069; H04L 5/001
  USPC .......................................................... 370/280
  See application file for complete search history.

(56) References Cited

U.S. PATENT DOCUMENTS

| | | | |
|---|---|---|---|
| 2008/0043710 A1 | 2/2008 | Zhou et al. | |
| 2008/0144530 A1 | 6/2008 | Che et al. | |
| 2009/0067377 A1 | 3/2009 | Talukdar et al. | |
| 2009/0180459 A1 | 7/2009 | Orlik et al. | |
| 2009/0185632 A1 | 7/2009 | Cai et al. | |
| 2009/0201838 A1 | 8/2009 | Zhang et al. | |
| 2009/0213769 A1* | 8/2009 | Shen ...................... | H04W 72/14 370/280 |
| 2009/0238155 A1 | 9/2009 | Sun | |
| 2010/0008332 A1 | 1/2010 | Balachandran et al. | |
| 2010/0027446 A1* | 2/2010 | Choi ...................... | H04L 5/0053 370/280 |
| 2010/0220597 A1* | 9/2010 | Ji .......................... | H04W 16/10 370/241 |
| 2010/0246531 A1 | 9/2010 | Chang et al. | |
| 2011/0096783 A1 | 4/2011 | Cai et al. | |
| 2011/0141996 A1 | 6/2011 | Yamada et al. | |
| 2011/0211503 A1* | 9/2011 | Che ....................... | H04L 5/0005 370/280 |
| 2011/0261776 A1 | 10/2011 | Ahn et al. | |
| 2011/0274014 A1* | 11/2011 | Du ......................... | H04W 24/02 370/278 |
| 2012/0002577 A1 | 1/2012 | Ishii et al. | |
| 2012/0082071 A1 | 4/2012 | Lv et al. | |
| 2012/0182950 A1* | 7/2012 | Chung .................. | H04L 5/0053 370/329 |
| 2012/0263079 A1* | 10/2012 | Struhsaker ............ | H04W 84/14 370/280 |
| 2013/0028205 A1 | 1/2013 | Damnjanovic et al. | |
| 2013/0121189 A1* | 5/2013 | Bhattad ................ | H04W 72/082 370/252 |
| 2013/0235754 A1 | 9/2013 | Lim et al. | |
| 2013/0272170 A1* | 10/2013 | Chatterjee ............. | H04W 28/02 370/280 |
| 2013/0315196 A1 | 11/2013 | Lim et al. | |
| 2014/0161003 A1* | 6/2014 | Han ..................... | H04W 52/146 370/280 |
| 2015/0085797 A1 | 3/2015 | Ji et al. | |
| 2015/0173048 A1 | 6/2015 | Seo et al. | |

FOREIGN PATENT DOCUMENTS

| | | |
|---|---|---|
| CN | 101855880 | 10/2010 |
| CN | 101904125 | 12/2010 |
| CN | 101933283 | 12/2010 |
| CN | 102025411 | 4/2011 |
| CN | 102215534 | 10/2011 |
| WO | 2011/025333 | 3/2011 |
| WO | 2011044166 | 4/2011 |
| WO | 2011154030 | 12/2011 |

OTHER PUBLICATIONS

PCT International Application No. PCT/KR2013/005314, Written Opinion of the International Searching Authority dated Oct. 1, 2013, 10 pages.
State Intellectual Property Office of the People's Republic of China Application Serial No. 201380031991.3, Office Action dated Mar. 3, 2017, 16 pages.
The State Intellectual Property Office of the People's Republic of China Application Serial No. 201380032005.6, Office Action dated Jan. 5, 2017, 6 pages.
United States Patent and Trademark Office U.S. Appl. No. 14/408,912, Final Office Action dated Oct. 6, 2016, 22 pages.
PCT International Application No. PCT/KR2013/005311, Written Opinion of the International Searching Authority dated Sep. 27, 2013, 10 pages.
State Intellectual Property Office of the People's Republic of China Application Serial No. 201380031991.3, Office Action dated Sep. 27, 2017, 11 pages.
United States Patent and Trademark Office U.S. Appl. No. 14/408,912, Office Action dated May 18, 2017, 25 pages.
United States Patent and Trademark Office U.S. Appl. No. 14/408,912 Office Action dated Mar. 25, 2016, 27 pages.
European Patent Office Application Serial No. 13807327.5, Search Report dated Jan. 27, 2016, 8 pages.

* cited by examiner

APPARATUS FOR TRANSCEIVING SIGNALS USING A TDD (TIME DIVISION DUPLEX) FRAME STRUCTURE IN A WIRELESS COMMUNICATION SYSTEM AND METHOD THEREOF

CROSS-REFERENCE TO RELATED APPLICATIONS

This application is the National Stage filing under 35 U.S.C. 371 of International Application No. PCT/KR2013/ 005314, filed on Jun. 17, 2013, which claims the benefit of U.S. Provisional Application Ser. No. 61/660,791, filed on Jun. 17, 2012 and 61/664,760, filed on Jun. 27, 2012, the contents of which are all hereby incorporated by reference herein in their entirety.

TECHNICAL FIELD

The present invention relates to a wireless communication system, and more particularly, to an apparatus for transceiving signals using a TDD (time division duplex) frame structure in a wireless communication system and method thereof.

BACKGROUND ART

Currently, a guard time for a switching to an uplink from a downlink exists in every TDD system. A problem of a transmission delay may be caused in accordance with a location of a user equipment in a cell. When all cells should match a downlink timing to an uplink timing, a current TDD frame structure may cause a problem that a resource is not efficiently used.

Thus, the current TDD frame structure may cause a problem that an efficient TDD frame structure management is difficult. However, any method for the efficient TDD frame structure management has not been proposed yet.

TECHNICAL TASK

One technical task of the present invention is to provide a method for a base station to transceive signals using a TDD (time division duplex) frame structure in a wireless communication system.

Another technical task of the present invention is to provide a method for a user equipment to transmit a signal using a TDD (time division duplex) frame structure in a wireless communication system.

Another technical task of the present invention is to provide a method for a base station to transmit a signal using a TDD (time division duplex) frame structure in a wireless communication system.

A further technical task of the present invention is to provide a user equipment, by which a signal is transmitted using a TDD (time division duplex) frame structure in a wireless communication system.

Technical tasks obtainable from the present invention are non-limited by the above-mentioned technical task. And, other unmentioned technical tasks can be clearly understood from the following description by those having ordinary skill in the technical field to which the present invention pertains.

TECHNICAL SOLUTION

To achieve these and other advantages and in accordance with the purpose of the present invention, as embodied and broadly described, a method of transceiving signals, which is transceived by a base station using a time division duplex (TDD) frame structure in a wireless communication system, includes transceiving the signals using a TDD frame in accordance with the TDD frame structure, wherein the TDD frame comprises a static downlink subframe region, a static uplink subframe region and a dynamic region changeable into a downlink subframe or an uplink subframe, wherein the TDD frame is configured in a manner that at least one of the static downlink subframe region, the static uplink subframe region and the dynamic region is assigned to a user equipment in consideration of a location of the user equipment in a cell, and wherein the signal is transceived with the user equipment via at least one region assigned in the TDD frame. Preferably, the static downlink subframe region and the static uplink subframe region in the TDD frame are assigned to the user equipment located at a edge of the cell. More preferably, the dynamic region in the TDD frame is assigned to the user equipment located at a center of the cell close to the base station. Preferably, a switching point from the downlink subframe to the uplink subframe is assigned to the dynamic region. Preferably, the regions in the TDD frame are located in order of the static downlink subframe region, the dynamic region and the static uplink subframe region.

To further achieve these and other advantages and in accordance with the purpose of the present invention, a method of tranceiving signals by a user equipment using a time division duplex (TDD) frame structure in a wireless communication system, includes transceiving the signals using an assigned region in a TDD frame in accordance with the TDD frame structure, wherein the TDD frame comprises a static downlink subframe region, a static uplink subframe region and a dynamic region changeable into a downlink subframe or an uplink subframe and wherein the user equipment transceives the signal via at least one of the assigned static downlink subframe region, the assigned static uplink subframe region and the assigned dynamic region assigned in consideration of a location of the user equipment. Preferably, the static downlink subframe region and the static uplink subframe region in the TDD frame are assigned to the user equipment located at a edge of the cell. More preferably, the dynamic region in the TDD frame is assigned to the user equipment located at a center of the cell close to the base station.

To further achieve these and other advantages and in accordance with the purpose of the present invention, a base station, which transceives signals using a time division duplex (TDD) frame structure in a wireless communication system, includes a transceiver and a processor, the processor is configured to control that the transceiver transceives the signals using a TDD frame in accordance with the TDD frame structure, wherein the TDD frame comprises a static downlink subframe region, a static uplink subframe region and a dynamic region changeable into a downlink subframe or an uplink subframe, wherein the TDD frame is configured in a manner that at least one of the static downlink subframe region, the static uplink subframe region and the dynamic region is assigned to a user equipment in consideration of a location of the user equipment in a cell, and wherein the processor is configured to control that the transceiver transceives the signals with the user equipment via the assigned region.

To further achieve these and other advantages and in accordance with the purpose of the present invention, a user equipment, which transceives signals using a time division duplex (TDD) frame structure in a wireless communication system, includes a transceiver and a processor, the processor is configured to control that the transceiver transceives the signals using an assigned region in a TDD frame in accordance with the TDD frame structure, wherein the TDD frame comprises a static downlink subframe region, a static uplink subframe region and a dynamic region changeable into a downlink subframe or an uplink subframe and wherein the processor is configured to control that the transceiver transceives the signals via at least one of the assigned static downlink subframe region, the assigned static uplink subframe region and the assigned dynamic region assigned in consideration of a location of the user equipment.

The above-mentioned general description of the present invention and the following details of the present invention are exemplary and may be provided for the additional description of the invention disclosed in claims.

ADVANTAGEOUS EFFECTS

Accordingly, the present invention may provide the following effects and/or features.

First of all, according to various embodiments of the present invention, a resource can be efficiently used per cell in accordance with a design of an improved TDD frame structure.

Secondly, the present invention performs a scheduling with reference to a TDD frame structure of a neighbor cell (heterogeneous network included), thereby enabling an efficient communication.

Effects obtainable from the present invention may be non-limited by the above mentioned effect. And, other unmentioned effects can be clearly understood from the following description by those having ordinary skill in the technical field to which the present invention pertains.

It is to be understood that both the foregoing general description and the following detailed description of the present invention are exemplary and explanatory and are intended to provide further explanation of the invention as claimed.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention. In the drawings.

BEST MODE FOR INVENTION

Reference will now be made in detail to the preferred embodiments of the present invention, examples of which are illustrated in the accompanying drawings. In the following detailed description of the invention includes details to help the full understanding of the present invention. Yet, it is apparent to those skilled in the art that the present invention can be implemented without these details. For instance, although the following descriptions are made in detail on the assumption that a mobile communication system includes 3GPP ($3^{rd}$ generation partnership project) LTE/LTE-A system, they are applicable to other random mobile communication systems except unique features of 3GPP LTE/LTE-A.

Occasionally, to prevent the present invention from getting vaguer, structures and/or devices known to the public are skipped or can be represented as block diagrams centering on the core functions of the structures and/or devices. Wherever possible, the same reference numbers will be used throughout the drawings to refer to the same or like parts.

Besides, in the following description, assume that a terminal or device is a common name of such a mobile or fixed user stage device as a user equipment (UE), a mobile station (MS), an advanced mobile station (AMS), and the like. And, assume that a base station is a common name of such a random node of a network stage communicating with a terminal as a Node B, an eNode B, a base station (BS), an access point (AP) and the like. Although the description of this specification is based on IEEE 802.16 system, the contents and technical idea of the present invention are applicable to various kinds of other communication systems.

In a mobile communication system, a user equipment can receive information in downlink from a base station and transmit information in uplink to the base station. The information transmitted or received by the user equipment may include data and various control information. And, various kinds of physical channels may exist in accordance with types and usages of the information transmitted or received by the user equipment.

The following description of embodiments of the present invention may apply to various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented with such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP (3rd Generation Partnership Project) LTE (long term evolution) is a part of E-UMTS (Evolved UMTS) that uses E-UTRA. The 3GPP LTE adopts OFDMA in downlink (hereinafter abbreviated) DL and SC-FDMA in uplink (hereinafter abbreviated UL). And, LTE-A (LTE-Advanced) is an evolved version of 3GPP LTE.

Specific terminologies used for the following description may be provided to help the understanding of the present invention. And, the use of the specific terminology may be modified into another form within the scope of the technical idea of the present invention.

Figure 1:
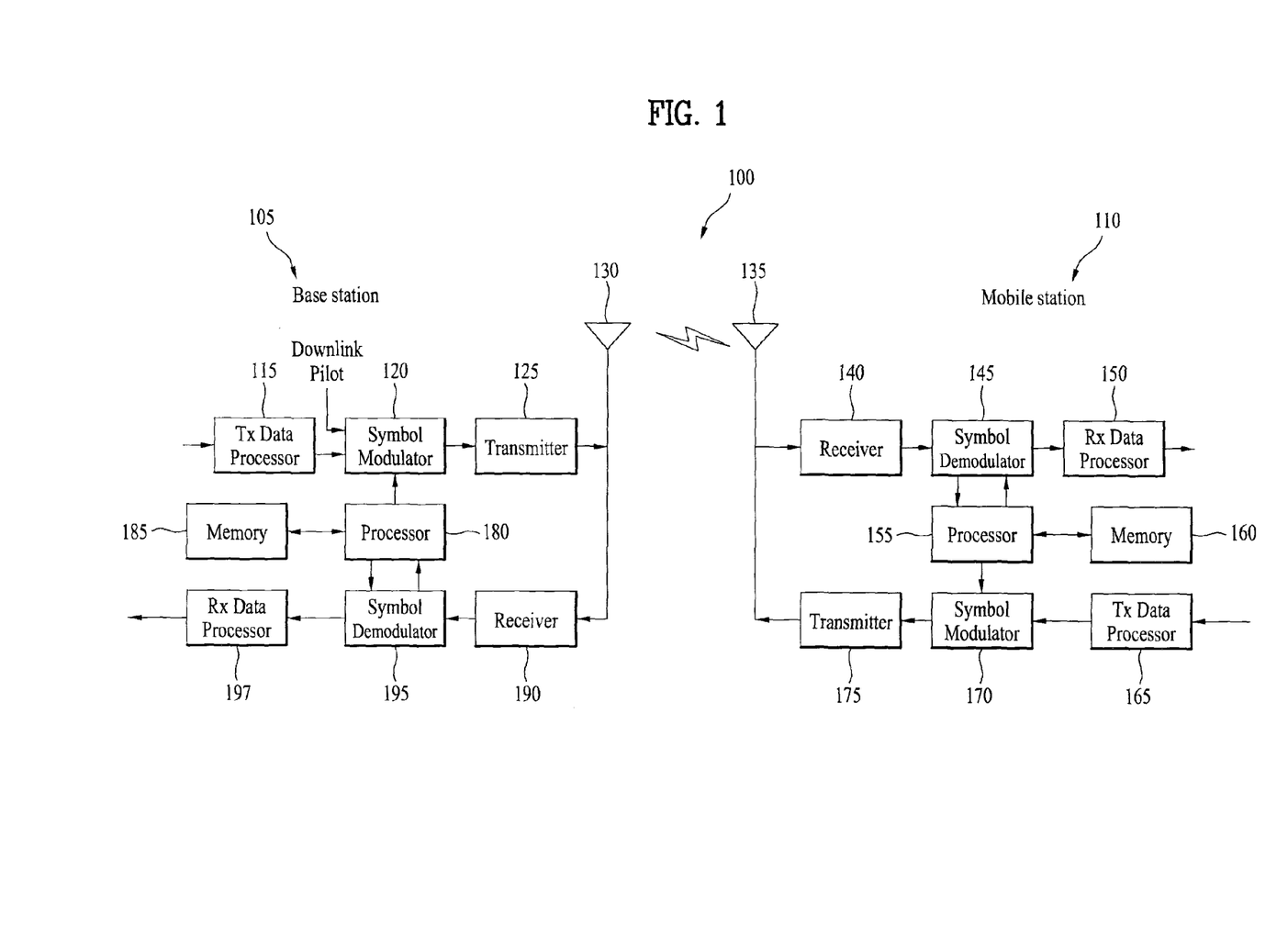
FIG. 1 is a block diagram for configurations of a base station 105 and a user equipment 110 in a wireless communication system 100.

FIG. 1 is a block diagram for configurations of a base station 105 and a user equipment 110 in a wireless communication system 100.

Although one base station 105 and one user equipment 110 are shown in the drawing to schematically illustrate a wireless communication system 100, the wireless communication system 100 can include at least one base station and/or at least one user equipment.

Referring to FIG. 1, a base station 105 may include a transmitted (Tx) data processor 115, a symbol modulator 120, a transmitter 125, a transceiving antenna 130, a processor 180, a memory 185, a receiver 190, a symbol demodulator 195 and a received data processor 197. And, a user equipment 110 may include a transmitted (Tx) data processor 165, a symbol modulator 175, a transmitter 175, a transceiving antenna 135, a processor 155, a memory 160, a receiver 140, a symbol demodulator 155 and a received data processor 150. Although the base station/user equipment 105/110 includes one antenna 130/135 shown in the drawing, each of the base station 105 and the user equipment 110 includes a plurality of antennas. Therefore, each of the base station 105 and the user equipment 110 according to the present invention supports an MIMO (multiple input multiple output) system. And, the base station 105 according to the present invention can support both SU-MIMO (single user-MIMO) and MU-MIMO (multi user-MIMO) systems.

In the base station 105, the transmitter 125 and the receiver 190 can be replaced by a single transceiver. Likewise, in the user equipment 110, the transmitter 175 and the receiver 140 can be replaced by a single transceiver.

In downlink, the transmitted data processor 115 receives traffic data, performs coding on the received traffic data by formatting, interleaves the coded traffic data, modulates (or symbol maps) the interleaved data, and then provides modulated symbols (data symbols). The symbol modulator 120 provides a stream of symbols by receiving and processing the data symbols and pilot symbols.

The symbol modulator 120 multiplexes the data and pilot symbols together and then transmits the multiplexed symbols to the transmitter 125. In doing so, each of the transmitted symbols may include the data symbol, the pilot symbol or a signal value of zero (i.e., null). In each symbol duration, pilot symbols may be contiguously transmitted. In doing so, the pilot symbols may include symbols of frequency division multiplexing (FDM), orthogonal frequency division multiplexing (OFDM), time division multiplexing (CDM), or code division multiplexing (CDM).

The transmitter 125 receives the stream of the symbols, converts the received stream to at least one or more analog signals, additionally adjusts the analog signals (e.g., amplification, filtering, frequency upconverting, etc.), and then generates a downlink signal suitable for a transmission on a radio channel. Subsequently, the downlink signal is transmitted to the user equipment 110 via the transmitting antenna 130.

In the configuration of the user equipment 110, the receiving antenna 135 receives the downlink signal from the base station and then provides the received signal to the receiver 140. The receiver 140 adjusts the received signal (e.g., filtering, amplification and frequency downconverting), digitizes the adjusted signal, and then obtains samples. The symbol demodulator 145 demodulates the received pilot symbols and then provides them to the processor 155 for channel estimation.

The symbol demodulator 145 receives a frequency response estimated value for downlink from the processor 155, obtains data symbol estimated values (i.e., estimated values of the transmitted data symbols) by performing data demodulation on the received data symbols, and then provides the data symbol estimated values to the received (Rx) data processor 150. The received data processor 150 reconstructs the transmitted traffic data by performing demodulation (i.e., symbol demapping, deinterleaving and decoding) on the data symbol estimated values.

The processing by the symbol demodulator 145 and the processing by the received data processor 150 are complementary to the processing by the symbol modulator 120 and the processing by the transmitted data processor 115 in the base station 105, respectively.

Regarding the user equipment 110 in uplink, the transmitted data processor 165 provides data symbols by processing the traffic data. The symbol modulator 170 provides a stream of symbols to the transmitter 175 by receiving the data symbols, multiplexing the received data symbols, and then performing modulation on the multiplexed symbols. The transmitter 175 generates an uplink signal by receiving the stream of the symbols and then processing the received stream. The generated uplink signal is then transmitted to the base station 105 via the transmitting antenna 135.

In the base station 105, the uplink signal is received from the user equipment 110 via the receiving antenna 130. The receiver 190 obtains samples by processing the received uplink signal. Subsequently, the symbol demodulator 195 provides pilot symbols received in uplink and a data symbol estimated value by processing the obtained samples. The received data processor 197 reconstructs the traffic data transmitted from the user equipment 110 by processing the data symbol estimated value.

The processor 155/180 of the user equipment/base station 110/105 directs operations (e.g., control, adjustment, management, etc.) of the user equipment/base station 110/105. The processor 155/180 may be connected to the memory unit 160/185 configured to store program codes and data. The memory 160/185 is connected to the processor 155/180 to store operating systems, applications and general files.

The processor 155/180 may be called one of a controller, a microcontroller, a microprocessor, a microcomputer and the like. And, the processor 155/180 may be implemented using hardware, firmware, software and/or any combinations thereof. In the implementation by hardware, the processor 155/180 may be provided with one of ASICs (application specific integrated circuits), DSPs (digital signal processors), DSPDs (digital signal processing devices), PLDs (programmable logic devices), FPGAs (field programmable gate arrays), and the like.

Meanwhile, in case of implementing the embodiments of the present invention using firmware or software, the firmware or software may be configured to include modules, procedures, and/or functions for performing the above-explained functions or operations of the present invention. And, the firmware or software configured to implement the present invention is loaded in the processor 155/180 or saved in the memory 160/185 to be driven by the processor 155/180.

Layers of a radio interface protocol between a user equipment and a base station can be classified into $1^{st}$ layer (L1), $2^{nd}$ layer (L2) and $3^{rd}$ layer (L3) based on 3 lower layers of OSI (open system interconnection) model well known to communication systems. A physical layer belongs to the $1^{st}$ layer and provides an information transfer service via a physical channel. RRC (radio resource control) layer belongs to the $3^{rd}$ layer and provides control radio resources between UE and network. A user equipment and a base station may be able to exchange RRC messages with each other via a radio communication network using RRC layers.

In the present specification, the processor 155 of the user equipment 110 performs operations of processing signals and data except signal transceiving and storing functions of the user equipment 110. And, the processor 180 of the base station 105 performs operations of processing signals and data except signal transceiving and storing functions of the base station 105. Yet, for clarity, the processors 155 and 180 are not specially mentioned in the following description. Therefore, the processor 155 can perform a series of operations such as a data processing and the like other than the signal transceiving and storing functions, which may not be specially mentioned in the following description.

In TDD (time division duplex) system, while a specific user equipment is receiving a signal from a base station, if another user equipment, which is transmitting an uplink signal with a strength of a big signal, exists around the specific user equipment, it causes a problem that the specific user equipment may not be able to correctly receive the signal from the base station. In order to prevent such a problem from being caused, all cells should match an uplink timing with a downlink. Yet, since a transmission delay exists and differs depending on a size of a cell, a user equipment in a remote distance from a base station needs to transmit a signal in advance by a transmission delay time in consideration of a time for arriving at the base station. This transmission delay time is called a timing advance (TA).

Hence, in order to prevent a downlink signal and an uplink signal from overlapping with each other at a specific point, a guard time (or a guard interval) amounting to 2 TA, which is the value resulting from adding a downlink transmission delay time (TA) and an uplink timing advance (TA) to each other, should exist. To this end, a guard time exists in TDD system in consideration of a cell radius. For instance, a guard time of about 0.5 ms (supportive of a radius of 75 km) exists in 3GPP LTE system.

However, although such a guard time is necessary for a user equipment located in a cell edge area in case of a large cell, since most of TDD systems consider a case of a small cell radius, if the guard time is configured in TDD system, it may result in the waste of considerable resources. Aside from the problem of the resource waste, it is necessary to give the degree of freedom in accordance with a data traffic property of each cell. In doing so, since each cell should have a matched downlink/uplink (DL/UL) ratio, it is necessary to design a new TDD frame structure. In the following description, various embodiments of new TDD frame structures proposed by the present invention are explained with reference to the accompanying drawings.

First Embodiment: TDD Frame Structure Design in Consideration of a Location of a User Equipment in a Cell A TDD frame structure according to a $1^{st}$ embodiment of the present invention relates to a new TDD frame structure in consideration of a location of a user equipment in a cell, thereby solving the problem of a related art TDD frame structure.

First of all, in case that a base station is aware of an approximate location of a user equipment in a cell, it is able to configure a frame in a manner that a guard time is not set up overall by coordinating a subframe available for each user equipment. For instance, since a user equipment located at a cell center can cover a DL transmission delay time and a UL transmission delay time (i.e., 2 TAs) in a CP (cyclic prefix) range, a guard time needs not to be given to user equipments located at the cell center close to the base station. On the other hand, a user equipment located at a cell edge can be implemented without a guard time if agreeing to not using a single UL subframe.

Figure 2:
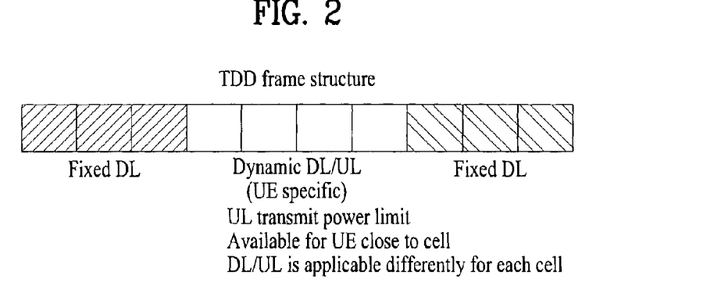
FIG. 2 is a diagram for one example of an improved TDD frame structure according to a first embodiment of the present invention.

FIG. 2 is a diagram for one example of an improved TDD frame structure according to a $1^{st}$ embodiment of the present invention.

Referring to FIG. 2, a TDD frame may include a static (or fixed) DL subframe region (static DL), a static UL subframe region (static UL), and a dynamic DL/UL subframe (dynamic DL/UL).

Since each cell needs to match UL/UL timing for a user equipment located at a cell edge, a static (DL/UL) subframe region for the user equipment located at the cell edge is configured in a structure of the TDD frame and each cell is allowed to flexibly determine the rest of the TDD subframe structure by itself. Subsequently, if a user equipment mainly located at a cell center is scheduled in the dynamic DL/UL region (hereinafter abbreviated a dynamic region), it may be unnecessary for each cell to precisely match a DL/UL subframe ratio (i.e., a DL-to-UL subframe number ratio).

Moreover, since a transmission of low power will be mainly performed in a dynamic region by scheduling a user equipment mainly located at a cell center, each cell (i.e., a base station in the corresponding cell) just determines a DL/UL switching point at a random place in the dynamic region by itself. Thus, it is able to put restriction of a UL transmit power of a user equipment close to a base station in a manner of scheduling a user equipment mainly located at a cell center in a dynamic region.

Thus, in consideration of a user equipment location, user equipments located close to a base station are mainly scheduled in a dynamic region and a user equipment located at a cell edge is scheduled in a static DL/UL region, and a switching point from DL to UL is set in the dynamic region. Therefore, it is able to prevent the considerable resource waste due to the guard time assignment of the related art.

In the example shown in FIG. 2, 3 subframes are assigned to the static DL subframe region (static DL), 3 subframes are assigned to the static UL subframe region (static UL), and 4 subframes are assigned to the dynamic region (dynamic DL/UL). Alternatively, the number of subframes assigned to each of the regions is changeable.

Second Embodiment: UE-Specific TDD Frame Structure in Consideration of Cell Radius and Location of User Equipment FIG. 3 is a diagram for one example of a specific frame structure per user equipment according to a $2^{nd}$ embodiment of the present invention.

For instance, in case of TD-LTE (time division-long term evolution), 1 frame amounts to 10 ms and a coverage decision by 150 km is possible for each 1 ms-subframe (or by 75 km in case of 0.5 ms-subframe). And, it is available within a CP range without a switching interval. In case of LTE normal CP (about 5 μs), it becomes about 1.4 km in aspect of transmission delay. And, it is able to cover a radius of about 400~500 m despite considering various margins.

A user equipment can report its TA to a base station. In doing so, the user equipment decides a TA range instead of a specific value and may report the decided TA range to the base station. Alternatively, the user equipment may report the number of unavailable subframes based on TA. Such a reporting can be performed if the TA exceeds a predetermined threshold or becomes equal to or smaller than the predetermined threshold. Alternatively, such a report can be performed periodically. Based on the TA relevant content reported by the user equipment, the base station schedules the user equipment and adjusts a timing. Moreover, the base station can inform the user equipment of information on the number of available subframes.

Figure 3:
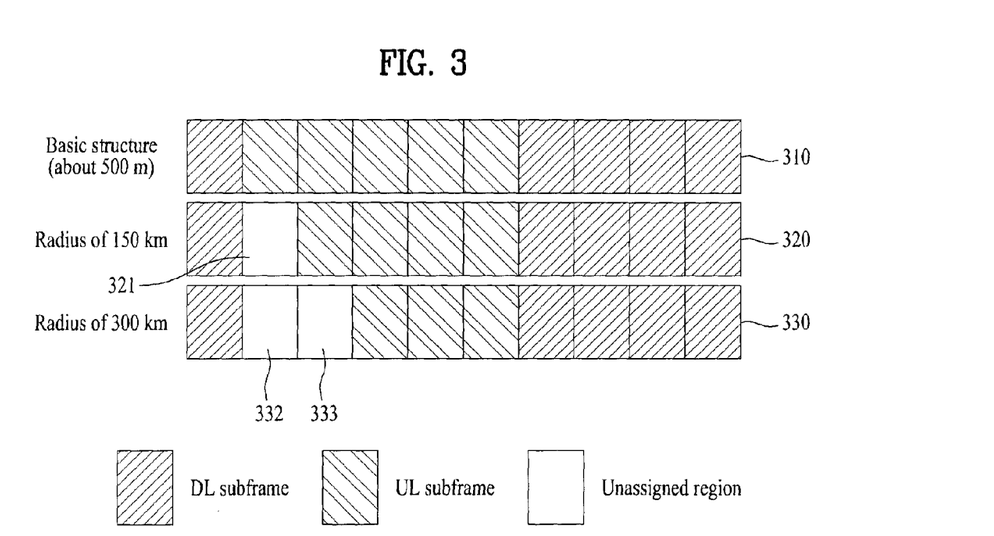
FIG. 3 is a diagram for one example of a specific frame structure per user equipment according to a second embodiment of the present invention.

Like the example of a frame structure 310 shown in FIG. 3, a base station can design a TDD frame structure with reference to a cell radius if 500 m. In particular, a $1^{st}$ subframe may be configured as a DL subframe, 5 subframes next to the $1^{st}$ subframe may be configured as UL subframes, and 4 subframes next to the UL subframes as DL subframes again. In this case, an unassigned region does not exist in case of a cell radius of about 500 m. Hence, the base station can schedule a user equipment located within the cell radius of about 500 m in accordance with the frame structure 310.

A frame structure 320 shown in FIG. 3 illustrates a case that a TDD frame structure convers a radius of about 150 km. Based on the TA reported by a user equipment located in a radius of about 150 km, a base station can schedule a $1^{st}$ UL subframe interval 321 as an assigned region. In this case, the number of UL subframes available for the user equipment located within the radius of about 150 km is decreased into 4.

A frame structure 330 shown in FIG. 3 illustrates a case that a TDD frame structure convers a radius of about 300 km. Based on the TA reported by a user equipment located in a radius of about 300 km, a base station can schedule a $1^{st}$ UL subframe interval 331 and a $2^{nd}$ UL subframe interval 333 as assigned regions. In this case, the number of UL subframes available for the user equipment located within the radius of about 300 km is decreased into 3.

Thus, it is able to design a UE-specific TDD frame structure in consideration of a location of a user equipment and a cell radius.

Third Embodiment: Generalization of the Second Embodiment

Figure 4:
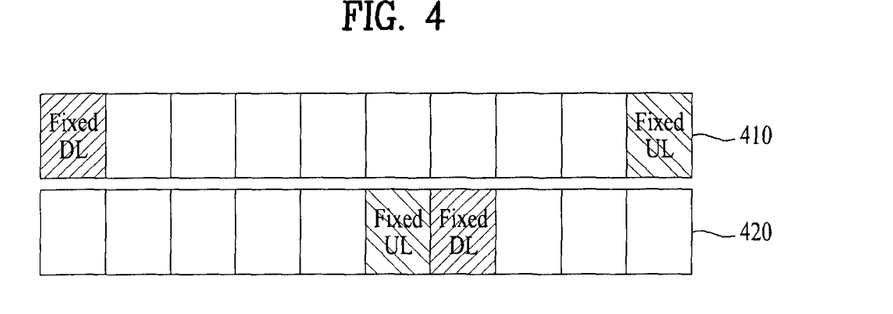
FIG. 4 is a diagram for one example of a TDD frame structure according to a third embodiment of the present invention.

FIG. 4 is a diagram for one example of a TDD frame structure according to a $3^{rd}$ embodiment of the present invention.

A $3^{rd}$ embodiment of the present invention can design a TDD frame structure 410/420 shown in FIG. 4 by further generalizing the above-described $2^{nd}$ embodiment. The static DL/UL subframe region (static DL/UL) in the former frame structure 310/320/330 according to the $2^{nd}$ embodiment of the present invention is arranged as shown in FIG. 4 for example and the rest of the regions can be used in a manner of being determined for each base station. Like the frame structure 410, a $1^{st}$ subframe may be assigned as a static DL subframe and a last subframe may be assigned as a static UL subframe. Like the frame structure 420, a static UL subframe and a static DL subframe may be configured adjacent to each other. For example, a $6^{th}$ subframe may be assigned as a static UL subframe and a $7^{th}$ subframe may be assigned as a static DL subframe.

The rest of the regions except the static DL/UL subframe region may be usable appropriately in accordance with a TA for each user equipment. In case that a UL subframe is switched to a DL subframe, since a delay amounting to 2 TAs exists, there is no interference in-between.

On the other hand, a base station determines a maximum transmit power in each UL subframe and then enables a corresponding user equipment to use the corresponding power. For instance, in case that a DL subframe to UL subframe ratio (DL/UL) is 6:4, when a transmit (Tx) power limit is determined for 4 UL subframes, a value (e.g., MAX=20 dBm) determined in a cell is determined for a static UL subframe (static UL) and the transmit power limit may be attenuated for the rest of UL subframes by a unit of 1 dB. The base station can signal the value of MAX 20 dBm to the user equipment by RRV (radio resource control) signaling.

If the attenuation for UL subframes is set to −3, −2, −1 and 0, a user equipment can perform transmissions with 17 dBm, 18 dBm, 19 dBm and 20 dBm in the corresponding subframes, respectively. The values according to such attenuation may be signaled by a base station to a user equipment through a broadcast channel (BCH) or the like.

Unlike the case of limiting a maximum transmit power for each UL subframe, a base station may indicate the number (e.g., 1, 2, 3, 4) of allowable UL subframes with reference to a current transmit power of a user equipment.

On the other hand, when base stations share DL-to-UL subframe (DL/UL) ratio information with each other, it is able to determine a maximum transmit power reference based on the shared information. For instance, in case that all neighbor base stations use at least two UL subframes, last 2 UL subframes may be set available with a maximum power. Moreover, if a rate for each base station to use a specific subframe as a DL subframe is high, a transmit power limit in the corresponding specific subframe may be set high.

This improved TDD subframe structure is applicable to a heterogeneous network (HetNet) as well. In a heterogeneous network, for the rest of regions except the static region in FIG. 4, a small cell have a configuration of its own by referring to a TDD frame configuration of a macro cell. With reference to a UL subframe maximum transmit power in a macro cell, a small cell can check whether a transmission in downlink is possible in a corresponding subframe. Moreover, in accordance with a DL transmit power received by a macro cell, it is able to check whether a corresponding subframe is available for a DL or UL in a small cell.

Accordingly, a resource can be efficiently used for each cell in accordance with a design of an improved TDD frame structure according to the various embodiments of the present invention mentioned in the foregoing description. And, a scheduling is performed with reference to a TDD frame structure in a neighbor cell (heterogeneous network included), whereby a communication can be efficiently performed.

The above-described embodiments may correspond to combinations of elements and features of the present invention in prescribed forms. And, it may be able to consider that the respective elements or features may be selective unless they are explicitly mentioned. Each of the elements or features may be implemented in a form failing to be combined with other elements or features. Moreover, it may be able to implement an embodiment of the present invention by combining elements and/or features together in part. A sequence of operations explained for each embodiment of the present invention may be modified. Some configurations or features of one embodiment may be included in another embodiment or can be substituted for corresponding configurations or features of another embodiment. And, it is apparently understandable that a new embodiment may be configured by combining claims failing to have relation of explicit citation in the appended claims together or may be included as new claims by amendment after filing an application.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

INDUSTRIAL APPLICABILITY

A method for a base station to transceive signals using a TDD (time division duplex) frame structure in a wireless communication system is industrially applicable to various kinds of mobile communication systems including 3GPP LTE, 3GPP LTE-A, IEEE 802 and the like.

The invention claimed is:

1. A method for transceiving signals by a base station (BS) based on a time division duplex (TDD) frame configuration in a wireless communication system, the method comprising:
performing a scheduling for a user equipment (UE) according to the TDD frame configuration, the TDD frame configuration being configured for the UE based on a location of the UE within a cell belonging to the base station,
wherein a number of uplink subframes of the TDD frame configuration is changeable based on the location of the UE,
wherein the uplink subframes in the TDD frame configuration comprises a fixed uplink subframe and an unfixed uplink subframe, and
wherein the unfixed uplink subframe can be flexibly changed to a downlink subframe by the base station; and
transmitting, to the UE, a first transmit power attenuation value of the unfixed uplink subframe when a subframe of a neighbor base station corresponding to a timing of the unfixed uplink subframe of the base station is configured as a downlink subframe; and
transmitting, to the UE, a second transmit power attenuation value of the unfixed uplink subframe, when the subframe of the neighbor base station corresponding to the timing of the unfixed uplink subframe of the base station is configured as an uplink subframe,
wherein the first transmit power attenuation value of the unfixed uplink subframe is larger than the second transmit power attenuation value of the unfixed uplink subframe, and
wherein the first and second transmit power attenuation values of the unfixed uplink subframe are larger than a transmit power attenuation value of the fixed uplink subframe.

2. The method of claim 1, wherein the TDD frame configuration is a UE-specific TDD frame configuration.

3. The method of claim 1, wherein the TDD frame configuration is changeable based on a data traffic characteristic of the base station.

4. The method of claim 1, further comprising:
sharing the TDD frame configuration configured for the base station with another base station.

5. A method for transceiving signals by a user equipment (UE) based on a time division duplex (TDD) frame configuration in a wireless communication system, the method comprising:
receiving signals according to the TDD frame configuration, the TDD frame configuration being configured for the UE based on a location of the UE within a cell belonging to a base station,
wherein a number of uplink subframes of the TDD frame configuration is changeable based on the location of the UE,
wherein the uplink subframes in the TDD frame configuration comprises a fixed uplink subframe and an unfixed uplink subframe, and
wherein the unfixed uplink subframe can be flexibly changed to a downlink subframe by the base station;
receiving, from the base station, a first transmit power attenuation value of the unfixed uplink subframe when a subframe of a neighbor base station corresponding to a timing of the unfixed uplink subframe of the base station is configured as a downlink subframe; and
receiving, from the base station, a second transmit power attenuation value of the unfixed uplink subframe, when the subframe of the neighbor base station corresponding to the timing of the unfixed uplink subframe of the base station is configured as an uplink subframe,
wherein the first transmit power attenuation value of the unfixed uplink subframe is larger than the second transmit power attenuation value of the unfixed uplink subframe, and
wherein the first and second transmit power attenuation values of the unfixed uplink subframe are larger than a transmit power attenuation value of the fixed uplink subframe.

6. The method of claim 5, wherein the TDD frame configuration is changeable based on a data traffic characteristic of the base station.

7. A base station (BS) for transceiving signals based on a time division duplex (TDD) frame configuration in a wireless communication system, the BS comprising:
a processor configured to perform a scheduling for a user equipment (UE) according to the TDD frame configuration, the TDD frame configuration being configured for the UE based on a location of the UE within a cell belonging to the base station,
wherein a number of uplink subframes of the TDD frame configuration is changeable based on the location of the UE; and
wherein the uplink subframes in the TDD frame configuration comprises a fixed uplink subframe and an unfixed uplink subframe, and
wherein the unfixed uplink subframe can be flexibly changed to a downlink subframe by the base station; and
a transmitter configured to:
transmit, to the UE, a first transmit power attenuation value of the unfixed uplink subframe when a subframe of a neighbor base station corresponding to a timing of the unfixed uplink subframe of the base station is configured as a downlink subframe; and
transmit, to the UE, a second transmit power attenuation value of the unfixed uplink subframe, when the subframe of the neighbor base station corresponding to the timing of the unfixed uplink subframe of the base station is configured as an uplink subframe,
wherein the first transmit power attenuation value of the unfixed uplink subframe is larger than the second transmit power attenuation value of the unfixed uplink subframe, and
wherein the first and second transmit power attenuation values of the unfixed uplink subframe are larger than a transmit power attenuation value of the fixed uplink subframe.

8. The BS of claim 7, wherein the first TDD frame configuration is a UE-specific TDD frame configuration.

9. A user equipment (UE) for transceiving signals based on a time division duplex (TDD) frame configuration in a wireless communication system, the UE comprising:

a receiver configured to receive signals according to a TDD frame configuration, the TDD frame configuration being configured for the UE based on a location of the UE within a cell belonging to a base station, wherein a number of uplink subframes of the TDD frame configuration is changeable based on a location of the UE;

wherein the uplink subframes in the TDD frame configuration comprises a fixed uplink subframe and an unfixed uplink subframe, wherein the unfixed uplink subframe can be flexibly changed to a downlink subframe by the base station, and wherein the receiver is further configured to:
  receive, from the base station, a first transmit power attenuation value of the unfixed uplink subframe when a subframe of a neighbor base station corresponding to a timing of the unfixed uplink subframe of the base station is configured as a downlink subframe; and receive, from the base station, a second transmit power attenuation value of the unfixed uplink subframe, when the subframe of the neighbor base station corresponding to the timing of the unfixed uplink subframe of the base station is configured as an uplink subframe, wherein the first transmit power attenuation value of the unfixed uplink subframe is larger than the second transmit power attenuation value of the unfixed uplink subframe, and wherein the first and second transmit power attenuation values of the unfixed uplink subframe are larger than a transmit power attenuation value of the fixed uplink subframe.

10. The UE of claim 9, wherein the TDD frame configuration is changeable based on a data traffic characteristic of the base station.

* * * * *